W. E. HOSCH.
TRACTION WHEEL.
APPLICATION FILED APR. 16, 1915.
1,191,898.
Patented July 18, 1916.
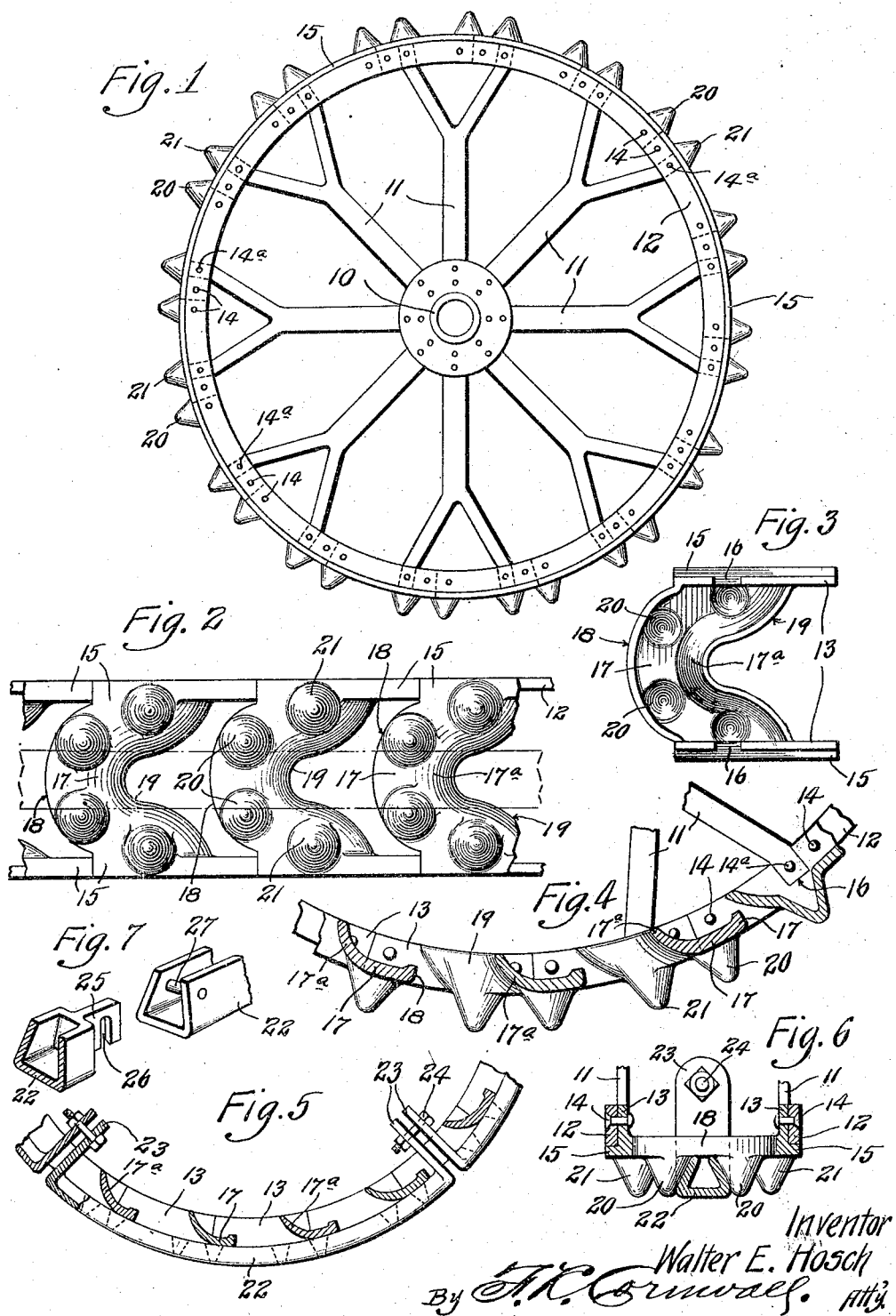
Inventor
Walter E. Hosch

UNITED STATES PATENT OFFICE.

WALTER E. HOSCH, OF ST. LOUIS, MISSOURI.

TRACTION-WHEEL.

1,191,898. Specification of Letters Patent. Patented July 18, 1916.

Application filed April 16, 1915. Serial No. 21,754. REISSUED.

*To all whom it may concern:*

Be it known that I, WALTER E. HOSCH, a citizen of the United States, residing at St. Louis, Missouri, have invented a certain new and useful Improvement in Traction-Wheels, of which the following is a full, clear, and exact description, such as will enable others skilled in the art to which it appertains to make and use the same, reference being had to the accompanying drawings, forming part of this specification.

My invention relates to traction wheels of the type generally used on heavy vehicles, such as tractors, motor vehicles, artillery, and heavy farming implements, such as threshing machines, motor plows, and the like, the principal object of my invention being to provide a comparatively light, strong and durable wheel having its rim portion formed so as to provide a maximum degree of tractive effect between the tread surfaces of the wheel and the surface of the ground upon which the wheel travels, and said rim portion being formed so as to engage and grip the surface of the ground, and reducing to a minimum the tendency of the wheel to slip or skid on slippery surfaces or to spin when soft ground is encountered.

Further objects of my invention are, to provide a traction wheel having a rim portion made up of a series of segmental members, any one of which can be readily removed in case it becomes broken or unfit for service; to provide the sectional rim members with prongs or projections which engage in the ground over which the wheel passes, thereby producing the desired tractive effect between said wheel and the ground; to provide a detachable sectional member which is adapted to be applied to the rim of the wheel when the same is traveling on a roadway or pavement, which detachable member prevents the projections on the rim from entering or breaking through the surface of the roadway, and further to provide a wheel having a rim portion which is practically self-cleaning, inasmuch as said rim portion is provided with openings through which soft dirt or mud will readily pass without clogging the spaces between the projections on the sections of said rim.

With the foregoing and other objects in view, my invention consists in certain novel features of construction and arrangements of parts, hereinafter more fully described, claimed and shown in the accompanying drawings, in which—

Figure 1 is a side elevational view of a traction wheel of my improved construction. Fig. 2 is a face view of the wheel rim. Fig. 3 is a plan view looking toward the inner face of one of the rim sections. Fig. 4 is a sectional view taken centrally through a portion of the rim of my improved wheel. Fig. 5 is a sectional view taken centrally through a portion of the rim of the wheel and showing the removable tread member in position upon the rim. Fig. 6 is an enlarged cross sectional view of the rim portion of the form of wheel illustrated in Fig. 5. Fig. 7 is a detailed view of a modified form of the joint between the end portions of the sections of the removable tread member.

As illustrated in the drawings, the main body of my improved wheel comprises a hub 10, two sets of spokes 11, the members of which are arranged in pairs with their inner ends fixed in any suitable manner to the end portions of the hub and secured to the outer ends of each set of spokes is a rim member 12 in the form of a metal ring.

The rim or tread portion of my improved wheel is supported by and occupies the space between the rings 12 and said rim portion is sectional in construction inasmuch as it is composed of a series of separately formed members which are alike in size and construction. Each member comprises a pair of side plates 13 which are curved to correspond with the curvature of the rings 12, and said plates are positioned directly against and rigidly fixed to said rings 12 in any suitable manner, preferably by means of rivets 14.

Formed integral with the outer portions of the plates 13 are outwardly projecting flanges 15 which bear directly against the outer edges of the rings 12. The plates 13 are provided with notches 16 or cut-away portions, which accommodate the outer ends of the spokes 11, the same being rigidly fixed to the rings 12 in any suitable manner, preferably by means of rivets 14$^a$.

When the members forming the sectional rim are properly assembled, the ends of the plates 13 of one member abut and bear directly against the ends of the next adjacent members, and by virtue of such construction any abnormal strain upon one of the sections during service will be transmitted to the adjacent sections and likewise the shearing of the rivets which attach said members to the rings will be prevented. Each pair of plates 13 is connected at one end by a transversely disposed plate 17, the main body portion of which occupies the same plane with the flanges 15, and said body portion between said flanges projects forwardly with respect to the corresponding ends of plates 13, said forwardly projecting portion being provided with a curved front edge 18. The entire rear portion 17ª of this plate 17 is curved or inclined upwardly with respect to the plane occupied by the main body portion of said plate, and the curved rear edge 19 of said upwardly projecting rear portion occupies substantially the same plane with the inner edges of the plates 13. Thus, when the sectional rim members are properly assembled, there will be a substantially triangular opening formed between each pair of members, which opening readily permits soft earth, sand or mud to pass upwardly through the rim portion of the wheel, thereby practically eliminating the tendency of soft earth and the like to clog and pack on the tread portion of the wheel.

Formed integral with the plate 17 at points a short distance to each side of the transverse center thereof are outwardly projecting studs or projections 20, the same being preferably conical in shape, and formed integral with and projecting outwardly from the end portions of said transverse plate are conical studs or projections 21. These studs or projections are arranged on the plate 17 so that portions of their surfaces coalesce or blend with portions of the curved or inclined surface 17ª, and by virtue of such construction, when the wheel is traveling over soft or muddy ground, that portion thereof which is positioned in the space between the projections will be forced upward along the inclined faces of said projections, and likewise, upward beneath the curved or inclined face 17ª. In other words, when the wheel is traversing soft or muddy ground, the engaged portion of the latter will be forced upward and packed into compact masses within the pockets formed in the substantially triangular spaces or openings between the sections of the rim, and as a result, the sections are firmly supported and at the same time, the packed masses of earth form a substantial base against which the projections engage to produce the desired tractive effect.

When a vehicle equipped with my improved wheel is traveling upon a pavement or made roadway, it is desirable that the projections on the rim of the wheel be prevented from engaging in the surface of the roadway as such action would break and destroy the smooth finished surface, and to overcome this, I have provided a tread member which is adapted to be easily and quickly applied to or detached from the wheel. This tread member comprises a series of curved channel-shaped sections 22, each being of sufficient length to overlie a series of the sectional rim members, and when applied for use, said tread members lie between the studs or projections 20 as seen in Fig. 6. By reason of the fact that these studs or projections are tapered toward their outer ends, the tread member 22 is necessarily widest at its outer face and said outer face occupies the same plane and lies flush with the outer ends of all of the studs or projections. Thus, as the wheel passes over the pavement or made roadway, the outer faces of the sections 22 form the tread or engaging surface of the wheel and the studs or projections are prevented from breaking through the surface of the roadway. The ends of the sections 22 are provided with inwardly projecting lugs 23, the same extending between pairs of the sectional rim members, and passing through said lugs 23 are draw-bolts 24, which, when tightened, draw the tread sections firmly into position between the pairs of studs 20.

In Fig. 7 I have shown a modified form of connection between the ends of the tread members 22, and in this modified construction, one end of one of the channel-shaped members is provided with a projecting tongue 25, in which is formed a notch 26, and the end of the next adjacent section is provided with a transversely disposed pin 27 which, when the sections are properly assembled, engages in said notch 26.

A wheel of my improved construction is comparatively simple, can be advantageously used upon all forms of vehicles, and particularly those designed for carrying heavy loads, and the construction of the rim portion of the wheel prevents the same from slipping or skidding upon slippery surfaces, and likewise prevents the wheels from spinning when soft ground is encountered. Inasmuch as the rim portion of the wheel is of sectional construction or made up of a series of segmental members, any one of said members can be readily removed in case it becomes broken or unfit for service. The removable tread member is easily and quickly applied to or removed from the wheel, and provides simple means for preventing the studs or projections on the rim of the wheel from entering the surface of the pavement or a made roadway when the wheel is passing thereover.

It will be readily understood that minor changes in the size, form and construction of the various parts of my improved traction wheel can be made and substituted for those herein shown and described, without departing from the spirit of my invention, the scope of which is set forth in the appended claims.

I claim:

1. A traction wheel rim comprising a pair of spaced supports and a series of rim sections secured to said supports, each of which sections comprises a transversely disposed plate, studs projecting outwardly therefrom, and a pair of side plates, which latter are fixed to the spaced supports with their ends bearing directly against the ends of the side plates of the adjacent rim sections.

2. A traction wheel rim comprising a pair of spaced supports and a series of rim sections secured to said supports, each of which sections comprises a plate, one edge of which is inclined with respect to the opposite edge, a series of studs formed on said plate, and a pair of side plates which are secured to the spaced supports with their ends bearing directly against the ends of the side plates of the adjacent rim sections.

3. A traction wheel rim comprising a pair of spaced supports and a series of rim sections secured to said supports, each of which comprises a plate, one edge of which is curved inwardly with respect to the other edge, a series of studs projecting outwardly from said plate, and a pair of side plates which are secured to the spaced supports with their ends bearing directly against the ends of the side plates of the adjacent rim sections.

4. The combination with a pair of spaced supporting rings, of tread members positioned between said spaced rings, each of which members comprises a pair of side plates, the ends of which bear directly against the ends of the adjacent members, a plate integral with said side plates, which plate is curved transversely, and a series of studs integral with and projecting outwardly from said plate.

5. The combination with a pair of spaced supporting rings, of tread members positioned between and fixed to said rings, each of which members comprises a pair of side plates, the ends of which bear directly against the ends of the plates of the adjacent tread members, a transversely disposed plate integral with said side plates, a series of studs projecting outwardly from said transversely disposed plate, and flanges on said side plates which bear directly against the outer edges of the supporting rings.

6. In a traction wheel, the combination with a pair of spaced supporting rings, of a series of tread sections arranged between and fixed to said rings, a series of studs projecting outwardly from the tread surfaces of each section, each series of studs being arranged in a transversely disposed curved row.

7. In a traction wheel, the combination with a pair of spaced supporting rings, of a series of tread sections arranged between and fixed to said rings, a series of studs projecting outwardly from the tread surfaces of each section, each series of studs being arranged in a transversely disposed curved row, and there being openings formed between said tread members.

8. The combination with a traction wheel rim having outwardly projecting studs on its tread surface, of a sectional tread member applied to the outer face of the rim and positioned between the studs thereon, the sections of which tread member are substantially channel-shaped in cross section, and readily detachable means for securing the ends of the tread members to each other.

9. The combination with a traction wheel rim having outwardly projecting studs on its tread surface, said studs being arranged in circumferentially disposed rows, of a sectional tread member applied to the outer face of the rim and positioned between the central pair of circumferentially disposed rows of studs.

10. The combination with a traction wheel rim, having outwardly projecting studs on its tread surface, said studs being arranged in circumferentially disposed rows, of a sectional tread member applied to the outer face of the rim and positioned between the central pair of circumferentially disposed rows of studs, and readily detachable means for securing the ends of the tread members to each other.

In testimony whereof I hereunto affix my signature in the presence of two witnesses, this 14th day of April, 1915.

WALTER E. HOSCH.

Witnesses:
M. P. SMITH,
M. A. HONDEL.